Patented Nov. 17, 1942

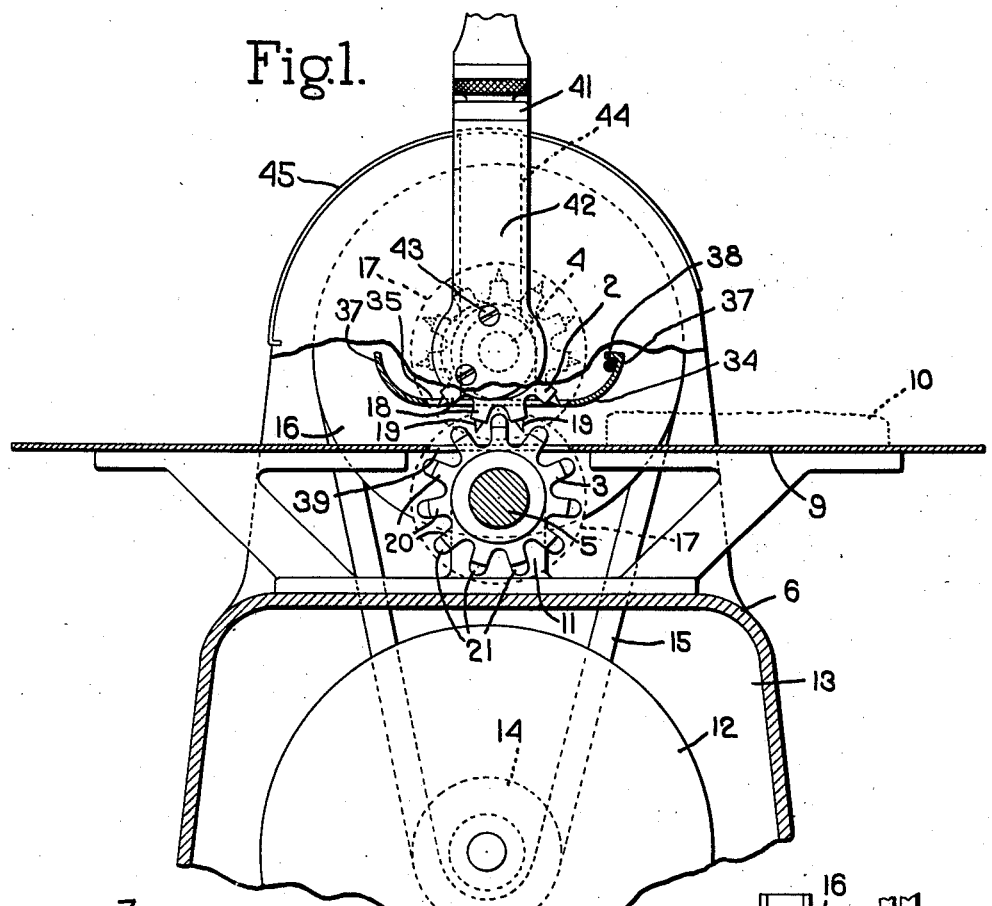
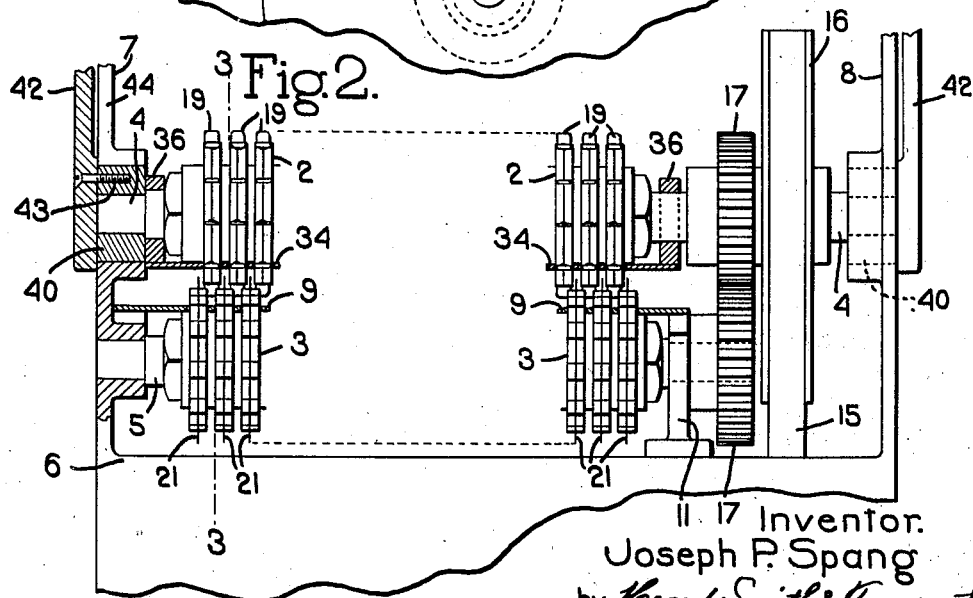

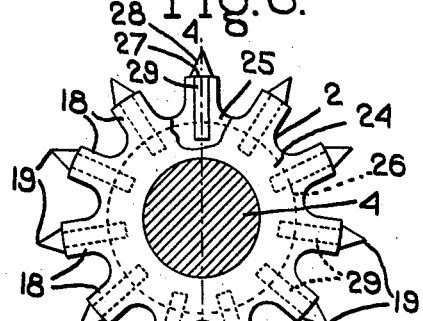
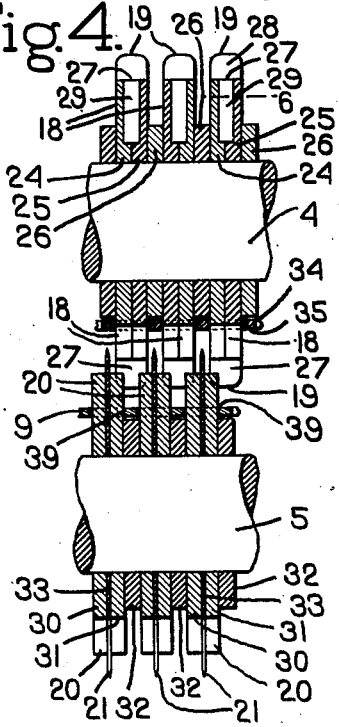
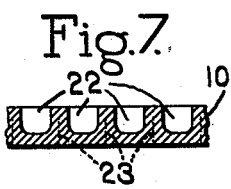
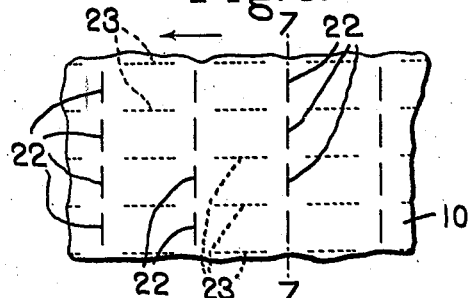
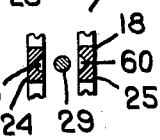
Inventor.
Joseph P. Spang
by Heard Smith & Tennant.
Attys.

2,302,398

UNITED STATES PATENT OFFICE 2,302,398

MEAT TENDERING MACHINE

Joseph P. Spang, Quincy, Mass., assignor to Cube Steak Machine Company, Inc., Boston, Mass., a corporation of Massachusetts Application December 30, 1939, Serial No. 311,904

4 Claims. (Cl. 17—26)

This invention relates to meat tendering machines of that type having a pair of toothed rolls between which the meat to be tendered is fed.

The teeth or arms on one roll terminate in cutting edges extending parallel to the axis of the roll, while the teeth or arms on the other roll terminate in cutting edges which extend in planes at right angles to the axis of the roll. Furthermore, in the present invention, the arms or teeth on each roll are arranged in circumferential rows and the rows on one roll have a staggered relation to those on the other roll, while the arms on one roll have an intermeshing relation with those on the other roll.

With this arrangement, the slice of meat which is fed through the machine will have parallel rows of short slits cut in each face of the meat with the slits in one face extending at right angles to those in the other face. The meat will thus be effectively tendered without loosing its shape as a slice.

In order to give an understanding of the invention, I have illustrated in the drawings a selected embodiment thereof which will now be described, after which the novel features will be pointed out in the appended claims.

In the drawings:

Fig. 1 is a side view of a machine embodying my invention with part broken out.

Fig. 2 is a fragmentary end view also having a part broken out to better show the construction.

Fig. 3 is an enlarged sectional view through the two rolls on substantially the line 3—3, Fig. 2.

Fig. 4 is a section on the line 4—4, Fig. 3.

Fig. 5 is a plan view of a portion of a slice of meat showing the manner in which the slits are cut in the meat.

Fig. 6 is a section through one of the arms, on the line 6—6, Fig. 4, but showing the parts of the arm separated.

Fig. 7 is a section through the slit slice of meat on the line 7—7, Fig. 5.

In the present invention, the tendering of the slice of meat is accomplished by feeding it between two meat tendering rolls 2 and 3. These rolls are mounted on shafts 4 and 5 that are suitably journaled in a frame 6. The upper portion of the frame is formed with the two uprights or standards 7 and 8 between which the tendering rolls 2 and 3 are located, and the device is also provided with a meat-supporting platform 9 on which the slice 10 of meat is supported as it is fed to the tendering rolls and is delivered therefrom.

The roll shaft 4 for the upper roll 2 is journaled at one end in the upright 7 and at the other end in the upright 8, while the shaft 5 for the lower roll 3 is journaled at one end in the upright 7 and in the other end is journaled in a bracket 11.

The tendering rolls 2 and 3 are driven from a suitable motor 12 which is located in a motor-receiving chamber 13 with which the frame is provided. This motor has a driving pulley 14 which is connected by a driving belt 15 with a pulley 16 on the roll shaft 4. The roll shaft 5 for the lower roll is driven from the roll shaft 4 of the upper roll by means of intermeshing gears 17 with which the shafts 4 and 5 are provided.

The upper roll 2 is provided with a plurality of circumferential rows of teeth or arms 18, each of which terminates in a cutting edge 19 that extends parallel to the axis of the roll.

The lower roll 3 is formed with a plurality of circumferential rows of arms 20, each of which terminates in a cutting edge 21 that extends in a plane at right angles to the axis of the roll 3. The spacing of the rolls 2 and 3, and the relation of the arms 18 and 20 thereon are such that the arms of one roll intermesh or interleave with those of the other roll, although without there being any actual contact between the teeth of one roll with those of the other roll, as seen in Figs. 1 and 3. Furthermore, the rows of arms 18 on the upper roll have a staggered relation with the rows of arms 20 on the lower roll, as shown best in Figs. 2 and 4. The dimension of each arm in the direction of the length of the roll is slightly greater than the spacing between adjacent rows of arms so that the arms 18 of any row on the upper roll will have a slightly overlapping relation with the arms of two adjacent rows on the lower roll.

When a slice 10 of steak is fed between the rolls, the cutting edges 19 on the arms 18 of the upper roll 2 will form in the upper face of the steak a plurality of rows of short slits 22, which slits extend transversely to the direction of feed of the meet, the latter being indicated by the arrow in Fig. 5. The cutting edges 21 in the arms or teeth 20 of the lower roll 3 will cut in the under side of the meat rows of short slits 23, each slit extending in the direction of feed or at right angles to the slits 22 in the upper face. Moreover, because of the intermeshing arrangement of teeth, the slits 23 in the under face of the meat will be cut between the rows of slits 22 in the upper face of the meat. In Fig. 5, which shows a portion of the meat in top plan view, the slits 22 which are cut in the upper face of the meat are shown in full lines, while the slits 23 which are cut in the under face of the meat are shown in dotted lines.

It is proposed to arrange the rolls and the arms thereon so that neither set of slits will be cut completely through the meat, the slits 22 in the upper face of the meat having a depth less than the thickness of the slice and the slits 23 in the under face of the meat also having a depth less than such thickness.

The cutting edges on the arms of the rolls may be provided for in various ways, and as herein shown, each circumferential row of arms 18 on the upper roll is formed by two toothed clamping disks 24, 25, which are mounted on the shaft 4 in a face-to-face relation, each pair of disks being spaced from the adacent pairs of disks by means of spacing collars 26. The cutting edges 19 are formed on cutter members 27 which are mounted in the ends of the arms 18. Each cutter member is made with a head 28 having the cutting edge 19 and with a stem 29 which is received in half grooves 30 that extend radially of the arms in the contacting faces of the disks 24, 25.

Each circumferential row of arms 20 is formed by the mating arms of a pair of clamping disks 30, 31, which are mounted on the shaft 5, each pair of disks being spaced from the adjacent pairs of disks by suitable spacing rings 32. The cutting edges 21 for the arms 20 are formed on thin cutter disks 33, each disk being clamped between a pair of disks 30, 31. Each cutter disk 33 is formed with teeth 64 which are somewhat longer than the arms 20 and thus project beyond said arms to provide the cutting edges 21. These cutting edges, it will be observed, occupy planes extending at right angles to the shaft 5. 34 indicates a stripper plate which is suspended from the shaft 4 and which is provided with slots 35 through which the arms 18 of the upper roll 2 extend. This stripper plate is secured at its opposite edges to two collars 36 which are supported on the shaft 4. The front and rear edges of the stripper plate are curved upwardly as shown at 37, and the upturned edge 37 at the side of the machine into which the slice of meat is fed has engagement with a stop member 38 which prevents the stripper from swinging forwardly as the meat moves under it.

The meat-supporting platform 9 is provided with slots 39 through which the arms 20 of the under roll 3 extend.

The mounting for the upper roll 2 is such that said roll can be adjusted toward and from the lower roll 3. To provide for this, the ends of the shaft 4 are eccentrically journaled in bushings 40 which are rotatably mounted in the uprights 7 and 8, so that by turning the bushings in the uprights, the roll 2 will be raised or lowered. To provide for thus turning the bushings, I employ a bail-shaped handle member 41, the arms or legs 42 of which embrace the uprights 7 and 8 and are secured to the bushings by suitable screws 43. The swinging movement of the bail-shaped member 41 thus operates to turn the bushings in their bearings, thus producing a vertical adjustment of the roll 2.

The uprights 7 and 8 are provided with vertical slots 44 through which the upper roll shaft 4 can be removed. To accomplish this, the screws 43 are first taken out, thus permitting the removal of the bail-shaped member 41. The bushings 40 are then withdrawn from the uprights 7 and 8, and this leaves the slots 44 open for the removal of the upper roll.

45 indicates a protective cover plate which is supported by the uprights 7 and 8. It will, of course, be necessary to remove this cover before the upper roll is removed from the machine.

I claim:

1. A meat-tendering machine comprising two cooperating tendering rolls, each provided with a plurality of pairs of toothed clamping disks, a toothed cutter disk clamped between the clamping disks of each pair on one tendering roll, the teeth of each cutting disk being longer than those of the corresponding clamping disks and terminating in cutting edges extending at right angles to the roll axis, a plurality of cutting members carried by each pair of clamping disks of the other tendering roll, each cutting member having a stem clamped between the mating teeth of a pair of disks and a body portion engaging the ends of the teeth and provided with a cutting edge extending parallel to the axis of the roll, and means to rotate the rolls.

2. A meat-tendering machine comprising two cooperating tendering rolls, each provided with a plurality of pairs of toothed clamping disks, a toothed cutter disk clamped between the clamping disks of each pair on one tendering roll, the teeth of each cutting disk being longer than those of the corresponding clamping disks and terminating in cutting edges extending at right angles to the roll axis, a plurality of cutter members carried by each pair of clamping disks on the other tendering roll, each cutter member having a stem clamped between the mating teeth of a pair of disks and a body portion located beyond said teeth and provided with a cutting edge extending parallel to the axis of the roll, means mounting said cooperating tendering rolls with the toothed disks of one roll intermeshing with those of the other, but out of contact therewith, and means independent from said toothed disks to rotate the rolls and maintain the intermeshing teeth of the disks out of contact during such rotation.

3. A meat-tendering machine comprising two cooperating tendering rolls, each having circumferential rows of radially extending arms terminating in cutting edges, shafts on which said rolls are mounted, means to rotate the shafts, a platform for supporting the meat to be tendered, said platform having slots through which the rows of arms on one roll project, collars loosely mounted on the shaft for the other roll, and a stripper member in the form of a plate secured to the under side of said collars and having slots with closed ends through which the rows of arms on said other roll project.

4. A meat-tendering machine comprising two cooperating tendering rolls, each having circumferential rows of radially extending arms terminating in cutting edges, shafts on which said rolls are mounted, means to rotate the shafts, a platform for supporting the meat to be tendered, said platform having slots through which the rows of arms on one roll project, collars loosely mounted on the shaft for the other roll, a stripper member in the form of a plate secured to the under side of said collars and having slots with closed ends through which the rows of arms on said other roll project, the front and rear edges of the stripper plate being curved upwardly and the front edge having an inturned lip, and a stop to engage said lip and prevent forward swinging movement of the stripper plate as the slice of meat is fed through the machine.

JOSEPH P. SPANG.